(12) United States Patent
Nagaike et al.

(10) Patent No.: US 11,041,601 B2
(45) Date of Patent: Jun. 22, 2021

(54) LIGHTING TOOL FOR VEHICLE

(71) Applicant: STANLEY ELECTRIC CO., LTD., Tokyo (JP)

(72) Inventors: Miyoko Nagaike, Tokyo (JP); Hiroyuki Chikama, Tokyo (JP); Shun Sato, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/818,821

(22) Filed: Mar. 13, 2020

(65) Prior Publication Data
US 2020/0300437 A1  Sep. 24, 2020

(30) Foreign Application Priority Data

Mar. 22, 2019 (JP) .............................. JP2019-054062

(51) Int. Cl.
*F21S 43/243* (2018.01)
*F21V 8/00* (2006.01)
(Continued)

(52) U.S. Cl.
CPC ........... *F21S 43/243* (2018.01); *F21S 43/239* (2018.01); *F21S 43/249* (2018.01);
(Continued)

(58) Field of Classification Search
CPC .. G02B 6/0018; G02B 6/0068; G02B 6/0075; G02B 6/0076; F21S 43/242–245; F21S 43/249; F21S 43/251
See application file for complete search history.

(56) References Cited

U.S. PATENT DOCUMENTS

2006/0146555 A1   7/2006  Inaba
2012/0069592 A1*  3/2012  Natsume ................. F21S 43/40
                                                362/511
(Continued)

FOREIGN PATENT DOCUMENTS

CN         105465711 A  *  4/2016  ............ F21S 43/249
DE    10 2005 021 079 A1    11/2006
(Continued)

OTHER PUBLICATIONS

The extended European Search Report for the related European Patent Application No. 20163641.2 dated Aug. 25, 2020.

*Primary Examiner* — Mariceli Santiago
(74) *Attorney, Agent, or Firm* — Kenealy Vaidya LLP

(57) ABSTRACT

A first light guide lens includes a first entering section and a first emitting section located on opposite side to the first entering section, the first emitting section has a shape inclined or curved so that an outer side thereof retreats further than an inner side thereof, a plurality of light emitting elements include a first light emitting element disposed at a position overlapping the first entering section at the inner side when seen in a front view, and a second light emitting element disposed at a position that does not overlap the first entering section at the outer side when seen in the front view, and a light guide section that guides light emitted from the second light emitting element to a position corresponding to the outer side of the first entering section is provided between the second light emitting element and the first entering section.

14 Claims, 7 Drawing Sheets

(51) Int. Cl.
*F21S 43/239* (2018.01)
*F21S 43/249* (2018.01)
*F21W 103/35* (2018.01)

(52) U.S. Cl.
CPC ......... *G02B 6/0018* (2013.01); *G02B 6/0068* (2013.01); *G02B 6/0075* (2013.01); *G02B 6/0076* (2013.01); *F21W 2103/35* (2018.01)

(56) References Cited

U.S. PATENT DOCUMENTS

| | | | |
|---|---|---|---|
| 2015/0003094 A1 | 1/2015 | Gebauer et al. | |
| 2017/0284624 A1 * | 10/2017 | Gloss | G02B 6/0001 |
| 2019/0154228 A1 * | 5/2019 | Xiang | F21S 41/192 |

FOREIGN PATENT DOCUMENTS

| | | | |
|---|---|---|---|
| DE | 10 2011 055 429 A1 | 5/2013 | |
| DE | 10 2013 225 950 A1 | 6/2015 | |
| EP | 2 818 791 A1 | 12/2014 | |
| FR | 3054641 A1 * | 2/2018 | F21S 43/14 |
| JP | 2013-16386 A | 1/2013 | |
| JP | 2020068111 A * | 4/2020 | |
| WO | WO-2010097185 A1 * | 9/2010 | F21S 43/237 |
| WO | 2017/168387 A1 | 10/2017 | |

* cited by examiner

LIGHTING TOOL FOR VEHICLE

CROSS-REFERENCE TO RELATED APPLICATION

Priority is claimed on Japanese Patent Application No. 2019-054062, filed Mar. 22, 2019, the content of which is incorporated herein by reference.

BACKGROUND

Field of the Invention

The present invention relates to a lighting tool for a vehicle.

Description of Related Art

In the related art, as a lighting tool for a vehicle mounted on a vehicle, a configuration in which a light source such as a light emitting diode (LED) or the like and a light guide lens are combined is known (for example, see Japanese Unexamined Patent Application, First Publication No. 2013-16386).

SUMMARY OF THE INVENTION

Incidentally, in the above-mentioned lighting tool for a vehicle, a slant angle (also referred to as a camber angle depending on an inclination direction) is provided on an emission surface (an emitting surface) of a light guide lens according to a slant shape provided on a corner section on a side of a front end or rear end of a vehicle.

For example, in the light guide lens in which the slant shape is provided, the emission surface has an inclined shape or a curved shape so that an outer side in a vehicle width direction thereof retreats farther than an inner side in a vehicle width direction with respect to a direction of advance of light emitted from the emission surface. In addition, a plurality of LEDs are disposed to be arranged in a stepped shape according to the shape of the light guide lens.

When the plurality of LEDs are disposed to be arranged in the stepped shape, a substrate obtained by folding sheet metal in a stepped shape, a flexible substrate that is foldable in a stepped shape, or the like, is used as the substrate on which these plurality of LEDs are mounted. However, these substrates are extremely expensive in comparison with flat plate substrates.

In addition, since assembly work for a stepped substrate cannot be easily performed by manual work, automated assembling equipment is required. As a result, manufacturing costs can be increased.

Meanwhile, when the plurality of LEDs are disposed to be arranged on the flat plate substrate, sufficient space for the number of LEDs required for uniform emission may not be able to be secured in the corner section due to the slant shape provided on the corner section on the side of the front end or the rear end of the vehicle.

As a result, in a portion of the emission surface far from the LED, a quantity of light emitted from the emission surface becomes insufficient, and in some cases, light does not reach the emission surface (emitting surface), resulting in dark areas. In particular, in a curved portion of the emission surface, luminous efficiency is deteriorated and a light and shade difference (luminance unevenness) easily occurs.

An aspect of the present invention is directed to providing a lighting tool for a vehicle that enables more uniform emission.

In order to accomplish the above-mentioned purposes, the present invention provides the following means.

[1] A lighting tool for a vehicle including:
a light source;
a first light guide lens disposed in front of the light source, and
a light guide section,
wherein the light source includes a plurality of light emitting elements mounted on a same substrate,
the first light guide lens includes a first entering section located on a side facing the light source and a first emitting section located on an opposite side with respect to the first entering section,
the first emitting section has an inclined shape or a curved shape so that at least an outer side in a vehicle width direction thereof retreats further than an inner side in a vehicle width direction thereof with respect to a vehicle forward and rearward direction,
the plurality of light emitting elements are disposed so as to be aligned from an inner side toward an outer side in the vehicle width direction, and include (i) a first light emitting element disposed at a position overlapping the first entering section at the inner side in the vehicle width direction when seen in a front view, and (ii) a second light emitting element disposed at a position that does not overlap the first entering section at the outer side in the vehicle width direction when seen in the front view, and
the light guide section configured to guide at least a part of light emitted from the second light emitting element to a position corresponding to the outer side of the first entering section in the vehicle width direction is provided between the second light emitting element and the first entering section.

[2] The lighting tool for a vehicle according to the above-mentioned [1], wherein the first entering section includes a first entering end portion configured to cause light emitted from the first light emitting element to enter the first light guide lens, and
the light guide section includes a second entering end portion configured to cause at least some of light emitted from the second light emitting element to enter thereinto, and a light guide reflecting section configured to guide light entered from the second entering end portion to a position corresponding to the outer side of the first entering section in the vehicle width direction while reflecting the light therein.

[3] The lighting tool for a vehicle according to the above-mentioned [1] or [2], wherein the second light emitting element is disposed around an outer end portion of the first light guide lens in the vehicle width direction.

[4] The lighting tool for a vehicle according to the above-mentioned [3], wherein the light guide section guides at least some of light emitted from the at least two second light emitting elements disposed around the outer end portion of the first light guide lens in the vehicle width direction to the same position corresponding to the outer side of the first entering section in the vehicle width direction.

[5] The lighting tool for a vehicle according to the above-mentioned [3] or [4], wherein the outer end portion of the first light guide lens in the vehicle width direction configures a curved section which is curved upward.

[6] The lighting tool for a vehicle according to the above-mentioned [5], wherein at least two second light emitting elements are disposed to be arranged along to a shape of the curved section.

[7] The lighting tool for a vehicle according to any one of the above-mentioned [1] to [6], including a second light guide lens that is disposed in front of the light source and that is adjacent to the first light guide lens, wherein the second light guide lens includes a second entering section located on a side facing the light source and a second emitting section located on an opposite side with respect to the second entering section, the second emitting section has an inclined shape or a curved shape so that at least an outer side in the vehicle width direction thereof retreats further than an inner side in the vehicle width direction thereof with respect to the vehicle forward and rearward direction, the plurality of light emitting elements include a third light emitting element disposed at a position overlapping the second entering section at an inner side in the vehicle width direction when seen in the front view, and the second light emitting element disposed at a position overlapping the second entering section at an outer side in the vehicle width direction when seen in the front view, and the second entering section includes a third entering end portion configured to cause light emitted from the third light emitting element to enter the second light guide lens, and a fourth entering end portion configured to cause some of light emitted from the second light emitting element to enter the second light guide lens.

[8] The lighting tool for a vehicle according to any one of the above-mentioned [1] to [6], including a second light guide lens that is disposed in front of the light source and that is adjacent to the first light guide lens, wherein the second light guide lens includes a second entering section located on a side facing the light source and a second emitting section located on an opposite side with respect to the second entering section, the second light emitting element is disposed at a position overlapping the second entering section outside in the vehicle width direction when seen in the front view, and the second entering section includes a fourth entering end portion configured to cause at least some of light emitted from the second light emitting element to enter the second light guide lens.

[9] The lighting tool for a vehicle according to the above-mentioned [7] or [8], wherein the second light guide lens is disposed adjacent to at least an outer end portion of the first light guide lens in the vehicle width direction.

[10] The lighting tool for a vehicle according to any one of the above-mentioned [7] to [9], wherein, among the light emitted from the second light emitting element, light from a central region of pupil surface of the second light emitting element enters the fourth entering end portion, and light from an outer circumferential region of the pupil surface enters a second entering end portion of the light guide section that is configured to cause at least some of light emitted from the second light emitting element to enter thereinto.

[11] The lighting tool for a vehicle according to any one of the above-mentioned [1] to [10], wherein the light guide section is constituted by at least a part of the first light guide lens.

[12] The lighting tool for a vehicle according to any one of the above-mentioned [7] to [10], wherein the light guide section is constituted by at least a part of the second light guide lens.

As described above, according to the aspect of the present invention, it is possible to provide a lighting tool for a vehicle that enables more uniform emission.

DETAILED DESCRIPTION OF THE INVENTION

Figure 1:
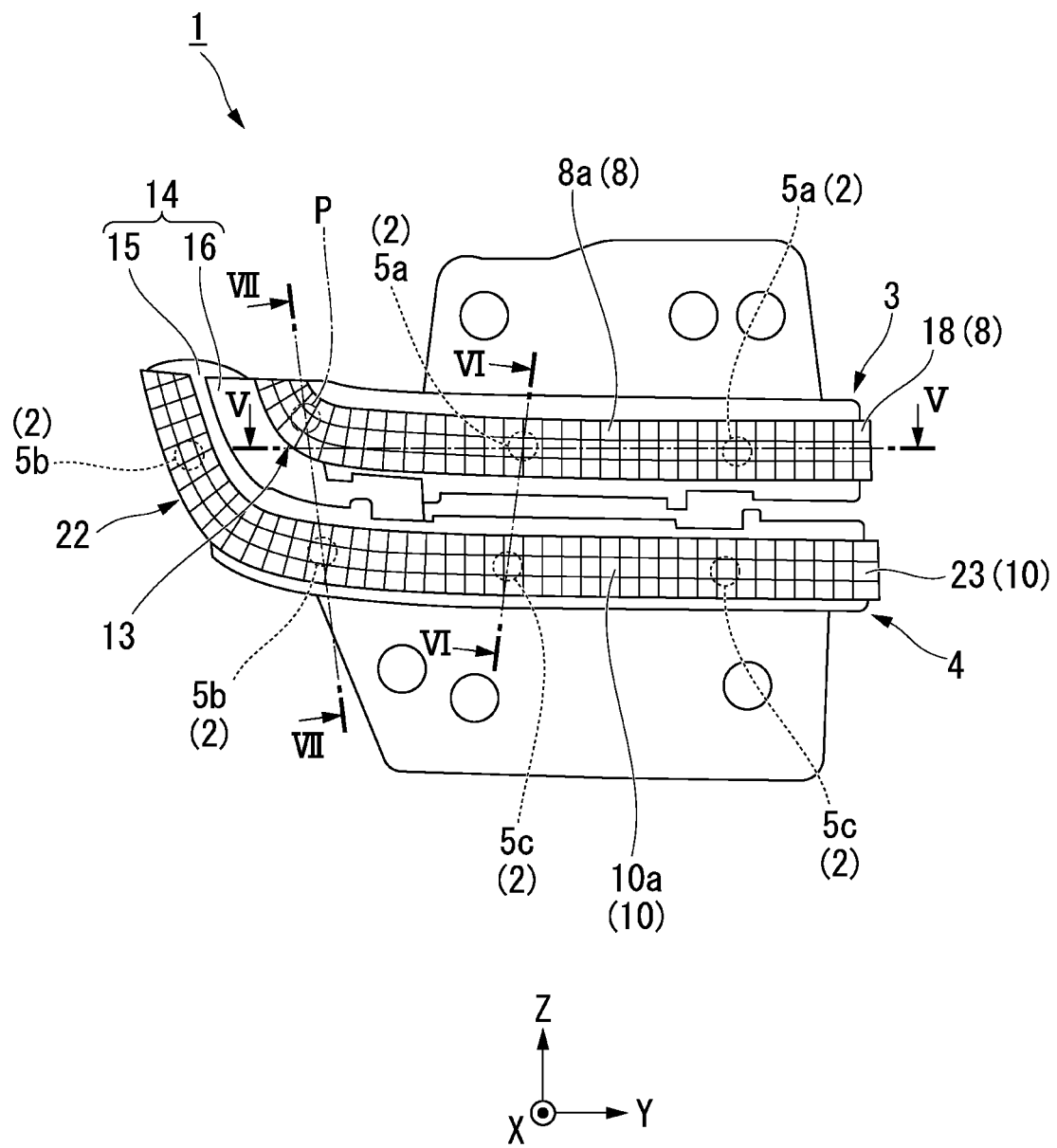
FIG. 1 is a front view showing a configuration of a lighting tool for a vehicle according to an embodiment of the present invention.

Hereinafter, an embodiment of the present invention will be described in detail with reference to the accompanying drawings.

Further, in the drawings used for the following description, in order to make components easier to see, scales of dimensions may be shown differently depending on the components, and dimensional ratios of the components are not always the same as the actual ones.

As an embodiment of the present invention, for example, a lighting tool 1 for a vehicle shown in FIG. 1 to FIG. 7 will be described.

Figure 2:
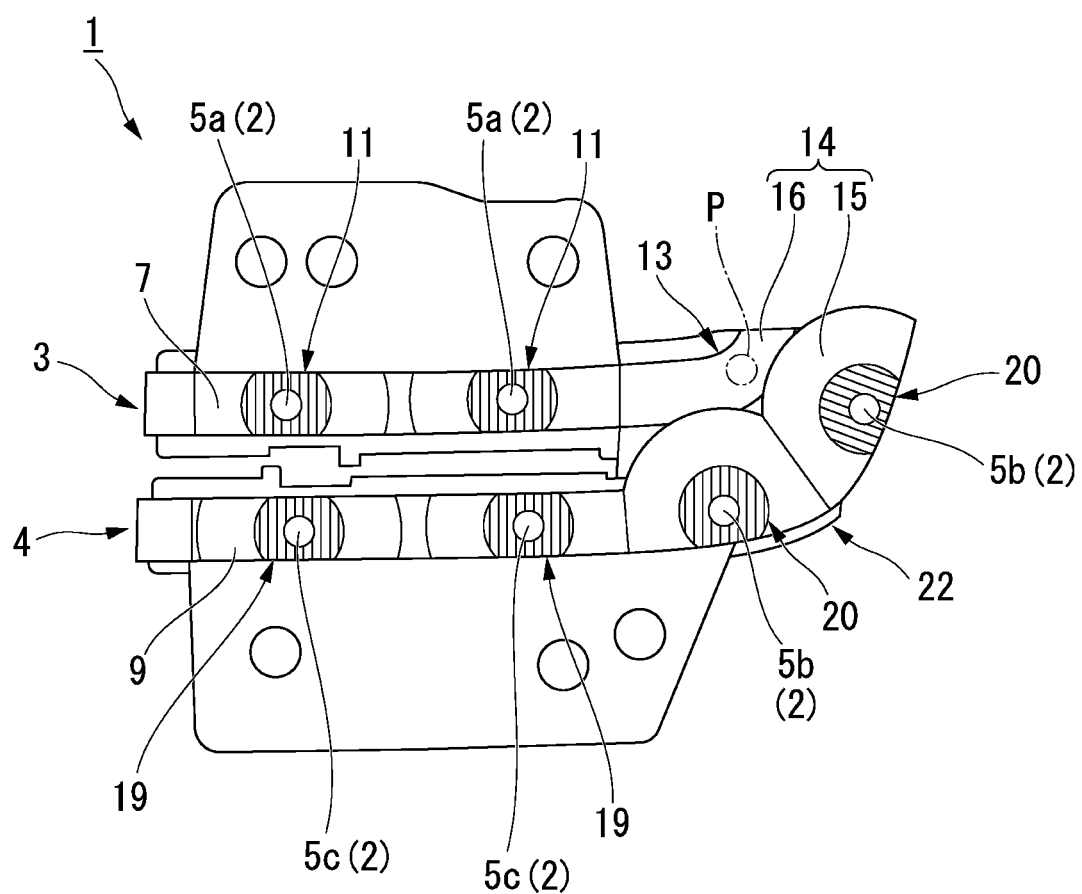
FIG. 2 is a rear view showing the configuration of the lighting tool for a vehicle shown in FIG. 1.
Figure 3:
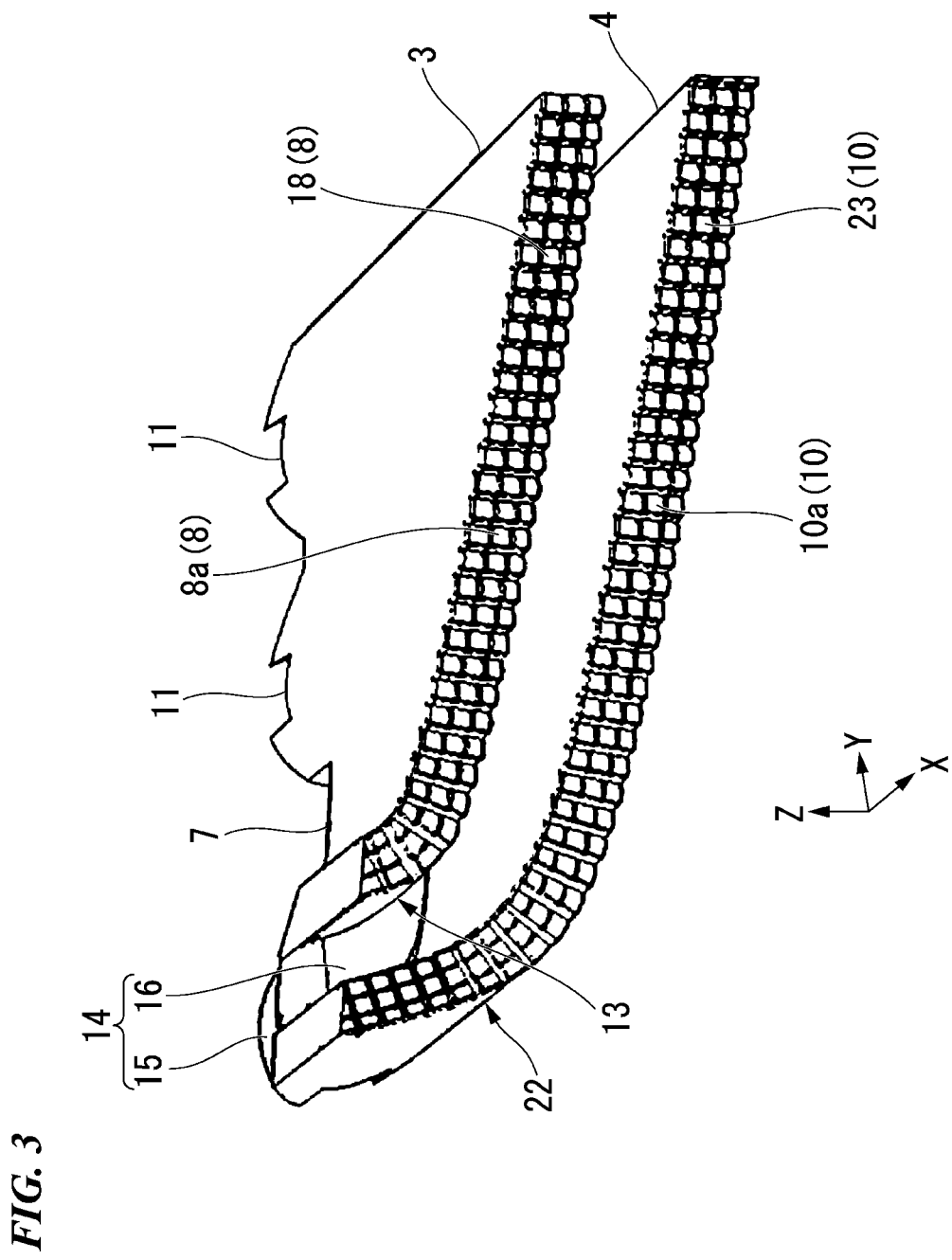
FIG. 3 is a perspective view showing a first light guide lens and a second light guide lens provided in the lighting tool for a vehicle shown in FIG. 1 from the front.
Figure 4:
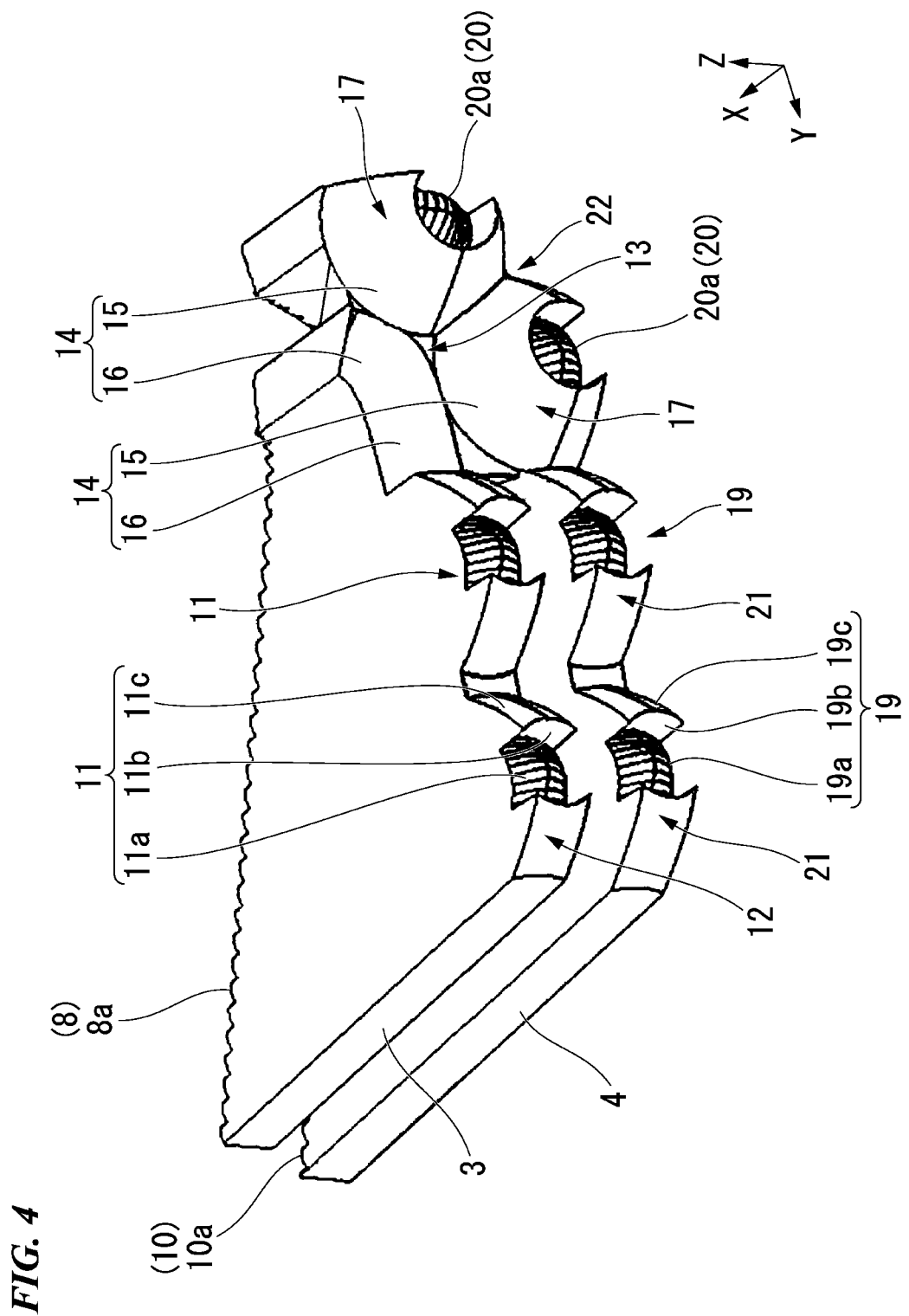
FIG. 4 is a perspective view showing the first light guide lens and the second light guide lens provided in the lighting tool for a vehicle shown in FIG. 1 from the rear.
Figure 5:
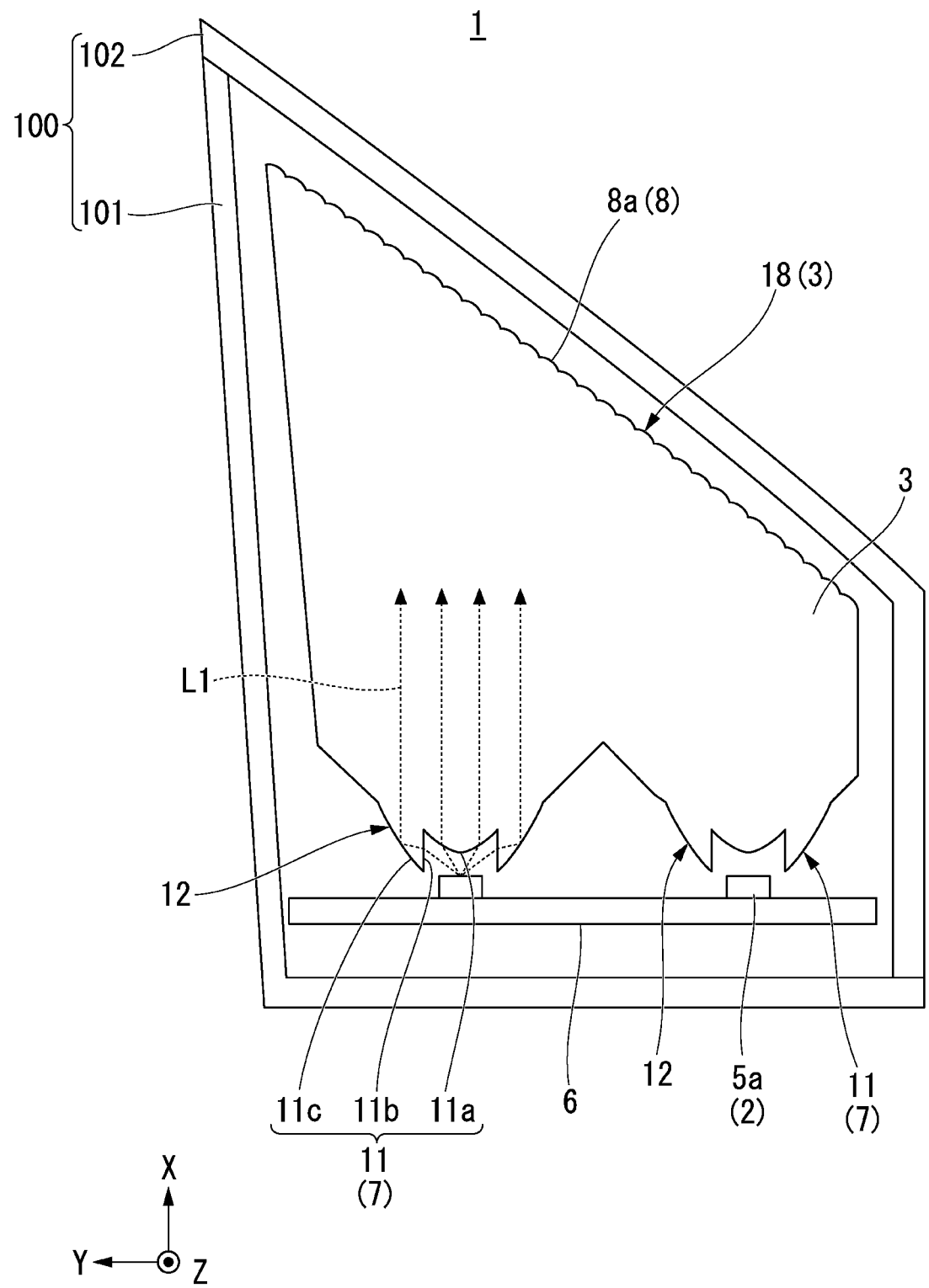
FIG. 5 is a cross-sectional view of the lighting tool for a vehicle taken along line V-V in FIG. 1.
Figure 6:
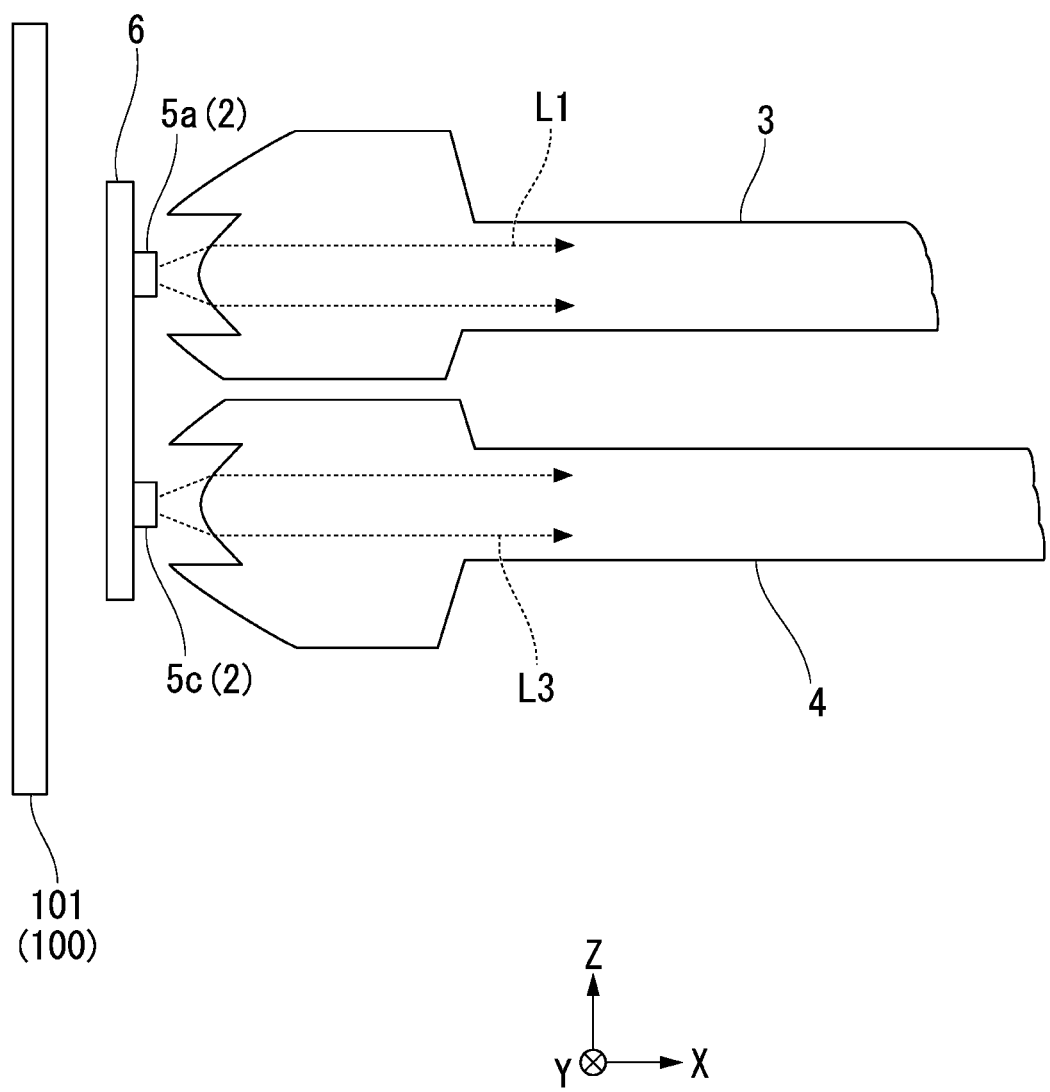
FIG. 6 is a cross-sectional view of the lighting tool for a vehicle taken along line VI-VI in FIG. 1.
Figure 7:
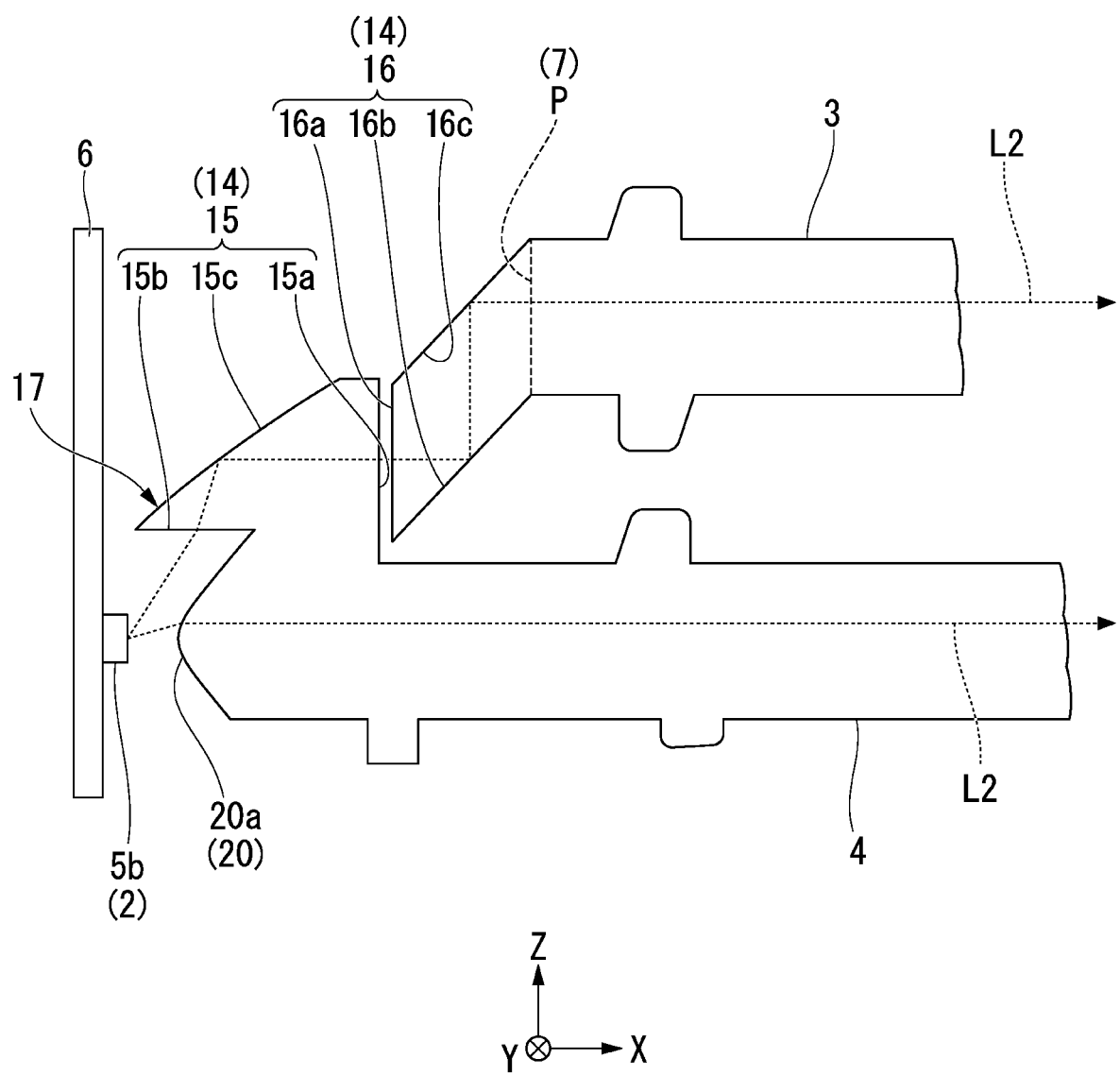
FIG. 7 is a cross-sectional view of the lighting tool for a vehicle taken along line VII-VII in FIG. 1.

Further, FIG. 1 is a front view showing a configuration of the lighting tool 1 for a vehicle. FIG. 2 is a rear view showing the configuration of the lighting tool 1 for a vehicle. FIG. 3 is a perspective view showing a first light guide lens 3 and a second light guide lens 4 provided in the lighting tool 1 for a vehicle from the front. FIG. 4 is a perspective view showing the first light guide lens 3 and the second light guide lens 4 provided in the lighting tool 1 for a vehicle from the rear. FIG. 5 is a cross-sectional view of the lighting tool 1 for a vehicle taken along line V-V in FIG. 1. FIG. 6 is a cross-sectional view of the lighting tool 1 for a vehicle taken along line VI-VI in FIG. 1. FIG. 7 is a cross-sectional view of the lighting tool 1 for a vehicle taken along line VII-VII in FIG. 1.

In addition, in the drawings described below, an XYZ orthogonal coordinate system is set, an X-axis direction is referred to as a forward and rearward direction (a lengthwise direction) of the lighting tool 1 for a vehicle, a Y-axis direction is referred to as a leftward and rightward direction (a widthwise direction) of the lighting tool 1 for a vehicle, and a Z-axis direction is referred to as an upward and downward direction (a height direction) of the lighting tool 1 for a vehicle.

The lighting tool 1 for a vehicle of the embodiment configures, for example, a brake lamp of rear combination lamps in both corner sections (in the embodiment, a corner section on a side of a left rear end) on a side of a rear end of the vehicle (not shown). The brake lamp is disposed inside a lighting body 100 that constitutes the rear combination lamp. The lighting body 100 is constituted by a housing 101, a front surface of which is open, and a lens cover 102 configured to cover an opening of the housing 101.

Further, in the following description, descriptions of "forward," "rearward," "leftward," "rightward," "upward" and "downward" are not particular limited, and mean directions when the lighting tool 1 for a vehicle is seen from a front surface thereof (behind the vehicle). Accordingly, directions of forward and rearward, leftward and rightward are reversed from directions when the vehicle is seen from a front surface thereof (in front of the vehicle).

The lighting tool 1 for a vehicle of the embodiment includes a light source 2, and the first light guide lens 3 and the second light guide lens 4, which are disposed in front of the light source 2 (on a side of a +X axis).

The light source 2 has a plurality of (in the embodiment, six) light emitting elements 5a, 5b and 5c configured to emit red light (hereinafter, simply referred to as light). As the light emitting elements 5a, 5b and 5c, LEDs can be used. The light emitting elements 5a, 5b and 5c are mounted on a surface of a circuit substrate 6 on which a driving circuit configured to drive the LEDs is provided. Accordingly, the light emitting elements 5a, 5b and 5c radially emit light forward from positions at which they are mounted on the circuit substrate 6.

The first light guide lens 3 and the second light guide lens 4 are constituted by flat light transmissive members. The light transmissive member may be formed of a material having a higher refractive index than that of air, for example, a transparent resin such as polycarbonate, acryl, or the like, glass, or the like.

The first light guide lens 3 and the second light guide lens 4 are disposed while being adjacent to each other in the upward and downward direction (the Z-axis direction). Among them, the first light guide lens 3 is disposed on an upper side (on the side of the +Z axis) in the upward and downward direction (the Z-axis direction). Meanwhile, the second light guide lens 4 is disposed on a lower side (on the side of the −Z axis) in the upward and downward direction (the Z-axis direction).

The first light guide lens 3 has a first entering section 7 disposed at a side facing the light source 2 (a back surface side), and a first emitting section 8 disposed at a side opposite to the first entering section 7 (a front surface side). The second light guide lens 4 has a second entering section 9 disposed at a side facing the light source 2 (a back surface side), and a second emitting section 10 disposed at a side opposite to the second entering section 9 (a front surface side).

The plurality of light emitting elements 5a, 5b and 5c are disposed to be aligned in the vehicle width direction (the Y-axis direction). In addition, the light source 2 is constituted by, among the plurality of light emitting elements 5a, 5b and 5c, a plurality of (in the embodiment, two) first light emitting elements 5a disposed at positions overlapping the first entering section 7 on an inward side in the vehicle width direction (a side of the +Y axis) when seen in a front view, a plurality of (in the embodiment, two) second light emitting elements 5b disposed at positions that do not overlap the first entering section 7 on an outward side in the vehicle width direction (a side of the −Y axis) when seen in a front view and positions overlapping the second entering section 9 when seen in a front view, and a plurality of (in the embodiment, two) third light emitting elements 5c disposed at positions overlapping the second entering section 9 on an inward side in the vehicle width direction when seen in a front view.

The first entering section 7 has a plurality of (in the embodiment, two) first entering end portions 11 configured to cause first light L1 emitted from the first light emitting elements 5a to enter the first light guide lens 3.

The plurality of first entering end portions 11 are provided to be next to the first entering section 7 in the widthwise direction (the Y-axis direction). Each of the first entering end portions 11 has a first light condensing and entering surface 11a that is disposed at a center portion facing the first light emitting element 5a and that is configured to cause some of the first light L1 emitted from the first light emitting element 5a to enter thereinto, a second light condensing and entering surface 11b that is disposed on inner circumferential sides of first protrusions 12 protruding from both sides in the widthwise direction toward the first light emitting elements 5a while having the first light condensing and entering surface 11a sandwiched therebetween and that is configured to cause the first light L1 emitted from the first light emitting elements 5a to enter thereinto, and a first light condensing and reflecting surface 11c that is disposed on an outer circumferential side of the first protrusions 12 and that is configured to reflect the first light L1 entered from the second light condensing and entering surface 11b toward the first emitting section 8.

In the first entering end portions 11, among the first light L1 emitted from the first light emitting elements 5a, the first light L1 entering from the first light condensing and entering surface 11a is condensed toward the first emitting section 8 in a direction of an optical axis. Meanwhile, the first light L1 is condensed toward the first emitting section 8 in a direction of the optical axis by reflecting (totally reflecting) the first light L1 entering from the second light condensing and entering surface 11b by using the first light condensing and reflecting surface 11c. Accordingly, in the first light guide lens 3, the first light L1 can be guided toward the first emitting section 8 on the front side while parallelizing the first light L1 entering from the first entering end portions 11 thereinto.

The first light guide lens 3 has a curved section 13 curved upward at an outward side in the vehicle width direction. That is, an outer end portion of the first light guide lens 3 in the vehicle width direction constitutes the curved section 13 curved upward. The curved section 13 is disposed further outward than the first entering end portions 11 in the vehicle width direction.

In the first light guide lens 3, a distance between the first entering section 7 and the first emitting section 8 gradually reduces from an inward side toward an outward side in the vehicle width direction. Accordingly, in the curved section 13, a distance between the first entering section 7 and the first emitting section 8 is the shortest.

In addition, it is difficult to secure a space for disposing the first light emitting elements 5a inside the lighting body 100 on the back surface side of the first entering section 7 corresponding to the curved section 13. For this reason, the first entering end portions 11 are not provided at position P corresponding to the curved section 13 of the first entering section 7, and the second light emitting elements 5b are disposed at positions that do not overlap the first entering section 7 in the curved section 13 when seen in a front view.

In the embodiment, the two second light emitting elements 5b are disposed to be aligned along shapes of the curved section 13. That is, the two second light emitting elements 5b are located at a surrounding of the outer end portions of the first light guide lens 3 in the vehicle width direction and are disposed at different positions in the widthwise direction (the Y-axis direction) and the upward and downward direction (the Z-axis direction) with each other.

Then, light guide section 14 configured to guide some of second light L2 emitted from the second light emitting elements 5b to the same positions corresponding to an outward side of the first entering section 7 in the vehicle width direction (in the embodiment, the position P corresponding to the curved section 13 of the first entering section 7) is provided between the two second light emitting elements 5b and the first entering section 7.

The light guide section 14 is configured to guide some of the second light L2 emitted from the second light emitting elements 5b disposed around the curved section 13 to the position P corresponding to the curved section 13 of the first entering section 7.

Specifically, the light guide section 14 has a second entering end portion 15 configured to cause some of the second light L2 emitted from the second light emitting elements 5b to enter thereinto at a position corresponding to the plurality of second light emitting elements 5b, and a light guide reflecting section 16 configured to guide the second light L2 entering from the second entering end portion 15 to the position P corresponding to the curved section 13 of the first entering section 7 while reflecting the second light L2 therein.

Among them, the second entering end portion 15 is constituted by a part of the second light guide lens 4.

Meanwhile, the light guide reflecting section 16 is constituted by a part of the first light guide lens 3. In addition, the second entering end portion 15 and the light guide reflecting section 16 oppose each other via opposing surfaces 15a and 16a facing each other.

The second entering end portion 15 has a third light condensing and entering surface 15b that is disposed on an inner circumferential side of a second protrusion 17 which protrudes from the second entering section 9 toward the second light emitting element 5b and that is configured to cause some of the second light L2 emitted from the second light emitting elements 5b to enter thereinto, and a second light condensing and reflecting surface 15c that is disposed on an outer circumferential side of the second protrusion 17 and that is configured to reflect the second light L2 entering from the third light condensing and entering surface 15b toward the opposing surface 15a.

At the second entering end portion 15, among the second light L2 emitted from the second light emitting element 5b, the second light L2 entering from the third light condensing and entering surface 15b is reflected (totally reflected) by the second light condensing and reflecting surface 15c, and thus, the second light L2 is condensed toward the opposing surface 15a in a direction of the optical axis. Accordingly, in the light guide section 14, the second light L2 is guided toward the light guide reflecting section 16 on the front side while parallelizing the second light L2 entering from the second entering end portion 15 thereinto.

The light guide reflecting section 16 have two inclined reflecting surfaces 16b and 16c that are constituted by portions protruding from the position P corresponding to the curved section 13 of the first entering section 7 toward the second entering end portion 15 and that face each other in parallel. In the light guide reflecting section 16, the second light L2 is guided to the position P corresponding to the curved section 13 of the first entering section 7 by reflecting (totally reflecting) the second light L2 entering via the opposing surfaces 15a and 16a by using the reflecting surfaces 16b and 16c. Accordingly, in the first light guide lens 3, the second light L2 is guided from the position P corresponding to the curved section 13 of the first entering section 7 toward the first emitting section 8 on the front side.

The first emitting section 8 has a first emission surface 8a inclined at least in a direction (a −X-axis direction) in which an outer side in the vehicle width direction thereof retreats further than an inner side in the vehicle width direction thereof according to a slant shape provided on the corner section on the side of the rear end of the vehicle. The first emitting section 8 has an inclined shape so that at least an outer side in a vehicle width direction thereof retreats farther than an inner side in the vehicle width direction thereof with respect to a vehicle forward and rearward direction. Further, the first emission surface 8a is not limited to such an inclined shape and may have a shape curved in a direction in which an outer side in the vehicle width direction thereof retreats further than an inner side in the vehicle width direction thereof.

The first emitting section 8 has a first diffusion section 18 configured to diffuse the first light L1 and the second light L2, which are emitted forward from the first emission surface 8a, in the widthwise direction. The first diffusion section 18 has a concavo-convex structure configured to diffuse the first light L1 and the second light L2, which have entered the first emission surface 8a, in the widthwise direction. As such concavo-convex structure, for example, a concavo-convex structure or the like formed by performing lens cutting referred to as flute cut or fisheye cut, knurling, emboss processing, or the like, may be exemplified. In addition, in the first diffusion section 18, a diffusion degree of the first light L1 and the second light L2 emitted from the first emission surface 8a can be controlled by adjusting a shape or the like of the concavo-convex structure.

The second entering section 9 has a plurality of (in the embodiment, two) third entering end portions 19 configured to cause third light L3 emitted from the third light emitting elements 5c to enter the second light guide lens 4, and a plurality of (in the embodiment, two) fourth entering end portions 20 configured to cause some of the second light L2 emitted from the second light emitting elements 5b to enter the second light guide lens 4.

The plurality of third entering end portions 19 are provided to be next to the second entering section 9 in the widthwise direction (the Y-axis direction). Each of the third entering end portion 19 has a fourth light condensing and entering surface 19a that is disposed at a center portion facing the third light emitting elements 5c and that is configured to cause some of the third light L3 emitted from the third light emitting elements 5c to enter thereinto, a fifth light condensing and entering surface 19b that is disposed at inner circumferential sides of third protrusions 21 protruding from both sides in the widthwise direction toward the third light emitting elements 5c while having the fourth light condensing and entering surface 19a sandwiched therebetween and that is configured to cause some of the third light L3 emitted from the third light emitting elements 5c to enter thereinto, and a third light condensing and reflecting surface 19c that is disposed on outer circumferential sides of the third protrusions 21 and that is configured to reflect the third light L3 entered from the fifth light condensing and entering surface 19b toward the second emitting section 10.

At the third entering end portions 19, among the third light L3 emitted from the third light emitting elements 5c, the third light L3 entering from the fourth light condensing and entering surface 19a is condensed toward the second emitting section 10 in the direction of the optical axis. Meanwhile, the third light L3 is condensed toward the second emitting section 10 in the direction of the optical axis by reflecting (totally reflecting) the third light L3 entered from the fifth light condensing and entering surface 19b by using the third light condensing and reflecting surface 19c. Accordingly, in the second light guide lens 4, the third light L3 can be guided toward the second emitting section 10 on the front side while parallelizing the third light L3 entering from the third entering end portions 19 thereinto.

The second light guide lens 4 has a curved section 22 curved upward at an outward side in the vehicle width direction. That is, an outer end portion of the second light guide lens 4 in the vehicle width direction constitutes the curved section 22 curved upward. In addition, the curved section 22 is disposed so as to surround the outer side of the curved section 13 of the first light guide lens 3.

In the second light guide lens 4, a distance between the second entering section 9 and the second emitting section 10 gradually reduces from an inward side toward an outward side in the vehicle width direction. Accordingly, in the curved section 22, a distance between the second entering section 9 and the second emitting section 10 is the shortest.

In addition, at a back surface side of the second entering section 9 corresponding to the curved section 22, the plurality of fourth entering end portions 20 are provided to be aligned in a curved direction of the curved section 22. Each of the fourth entering end portions 20 has a sixth light condensing and entering surface 20a that is disposed at a center portion facing the second light emitting elements 5b and that is configured to cause some of the second light L2 emitted from the second light emitting elements 5b to enter thereinto. The fourth entering end portion 20 includes those located outside the end portion of the first light guide lens 3 in the vehicle width direction.

In the fourth entering end portion 20, among the second light L2 emitted from the second light emitting elements 5b, the second light L2 entered from the sixth light condensing and entering surface 20a is condensed toward the second emitting section 10 in the direction of the optical axis. Accordingly, in the second light guide lens 4, the second light L2 is guided toward the second emitting section 10 on the front side while parallelizing the second light L2 entering from the fourth entering end portion 20 thereinto.

Accordingly, among the second light L2 emitted from the second light emitting elements 5b, light from a central region of a pupil surface thereof enters the fourth entering end portion 20, and light from an outer circumferential region of the pupil surface enters the second entering end portion 15.

Here, the light from the outer circumferential region of the pupil surface of the second light L2 is relatively weaker than the light from the central region of the pupil surface of the second light L2. Meanwhile, some of the second light L2 emitted from the two second light emitting elements 5b (the light from the outer circumferential region of the pupil surface of the second light L2) enters the position P corresponding to the curved section 13 of the first entering section 7 via the second entering end portion 15. Accordingly, a sufficient quantity of light at the position P corresponding to the curved section 13 of the first entering section 7 can be obtained.

The second emitting section 10 has a second emission surface 10a inclined at least in the direction in which an outer side thereof retreats further than an inner side thereof in the vehicle width direction according to the slant shape provided on the corner section on the rear end side of the vehicle. The second emitting section 10 has an inclined shape so that at least an outer side in a vehicle width direction thereof retreats farther than an inner side in the vehicle width direction thereof with respect to the vehicle forward and rearward direction. Further, the second emission surface 10a is not limited to such an inclined shape and may have a curved shape in which an outer side in the vehicle width direction thereof retreats further than an inner side in the vehicle width direction thereof.

The second emitting section 10 has a second diffusion section 23 configured to diffuse the second light L2 and the third light L3, which are emitted forward from the second emission surface 10a, in the widthwise direction. The second diffusion section 23 has a concavo-convex structure configured to diffuse the second light L2 and the third light L3, which have entered the second emission surface 10a, in the widthwise direction. As such concavo-convex structure, for example, a concavo-convex structure or the like formed by performing lens cutting referred to as flute cut or fisheye cut, knurling, emboss processing, or the like, may be exemplified. In addition, in the second diffusion section 23, a diffusion degree of the second light L2 and the third light L3 emitted from the second emission surface 10a can be controlled by adjusting a shape or the like of the concavo-convex structure.

In the lighting tool 1 for a vehicle of the embodiment having the above-mentioned configuration, as a brake lamp, the first and second emission surfaces 8a and 10a can uniformly emit red light by turning on the plurality of light emitting elements 5a, 5b and 5c upon braking of the vehicle.

In the lighting tool 1 for a vehicle of the embodiment, the curved section 13 is provided on outward side of the first light guide lens 3 in the vehicle width direction. It is difficult to secure a space configured to dispose the first light emitting element 5a inside the lighting body 100 on the back surface side of the first entering section 7 corresponding to the curved section 13. For this reason, the position P corresponding to the curved section 13 of the first emission surface 8a cannot be made to emit light by using the first light emitting element 5a.

With respect to this, in the lighting tool 1 for a vehicle of the embodiment, it is possible to guide some of the second light L2 emitted from the second light emitting element 5b, which is disposed on the position that do not overlap with the first entering section 7 when seen in a front view in the curved section 13, to the position P corresponding to curved section 14 of the first entering section 7 via the above mentioned light guide section 14.

In particular, in the lighting tool 1 for a vehicle of the embodiment, some of the second light L2 emitted from the plurality of second light emitting elements 5b disposed around the curved section 13 can be guided to the position P corresponding to the curved section 14 of the first entering section 7 via the above mentioned light guide section 14.

Accordingly, in the lighting tool 1 for a vehicle of the embodiment, even when a space for disposing the first light emitting element 5a cannot be secured inside the lighting body 100 at an outer side in the vehicle width direction (in particular, at the curved section 13) due to the slant shape provided in the corner section on the rear end side of the vehicle, it is possible to prevent insufficiency of a quantity of light of the lights L1, L2 and L3 emitted from the first and second emission surfaces 8a and 10a, or the light from not reaching the first and second emission surfaces 8a and 10a and becoming dark. Accordingly, in the lighting tool 1 for a vehicle of the embodiment, more uniform emission of the first and second emission surfaces 8a and 10a becomes possible.

In addition, in the lighting tool 1 for a vehicle of the embodiment, since the light source 2 in which the plurality of light emitting elements 5a, 5b and 5c are arranged on the flat circuit substrate 6 is used, it is possible to configure the lighting tool 1 for a vehicle at a more inexpensive price than the case in which a substrate obtained by folding a sheet metal in a stepped shape, a flexible substrate foldable in a stepped shape, or the like, is used.

Further, the present invention is not particularly limited to the embodiment and various modifications may be made without departing from the scope of the present invention.

Specifically, the light guide section 14 are not limited to the configuration constituted by a part of the first light guide lens 3 and a part of the second light guide lens 4 and may be constituted by a part of the second light guide lens 4 and a part of the second light guide lens 4.

For example, when the light guide section 14 is constituted by a part of the first light guide lens 3, the opposing surfaces 15a and 16a may be omitted, and the second entering end portion 15 and the light guide reflecting section 16 may be constituted by a part of the first light guide lens 3. Meanwhile, when the light guide section 14 is constituted by a part of the second light guide lens 4, the opposing surfaces 15a and 16a may be omitted, and the second entering end portion 15 and the light guide reflecting section 16 may be constituted by a part of the second light guide lens 4, and the second light L2 may be guided to the position P corresponding to the curved section 13 of the first entering section 7 via the light guide section 14.

Further, the light guide section 14 may be constituted by light guide lenses separate from the first and second light guide lenses 3 and 4.

In addition, in the lighting tool 1 for a vehicle, some of the second light L2 guided to the second light guide lens 4, which is adjacent to the first light guide lens 3, is guided to the first light guide lens 3 via the light guide section 14. Meanwhile, the present invention is not particularly limited to the above-mentioned configuration and may have a configuration in which the second light guide lens 4 is omitted.

In this case, the light guide section 14 may be provided on a part of the first light guide lens 3, and the second light L2 emitted from the second light emitting element 5b, which is disposed at a position that does not overlap the first entering section 7 when seen in a front view, may be guided to the first entering section 7.

In addition, in the lighting tool 1 for a vehicle, at least some of the second light L2 emitted from the second light emitting element 5b is guided to the position P corresponding to the curved section 13 of the first entering section 7 via the light guide section 14. Meanwhile, the present invention is not particularly limited to the above-mentioned configuration, and at least some of the second light L2 emitted from the second light emitting element 5b may be guided to a position corresponding to an outer side of the first entering section 7 in the vehicle width direction via the light guide section 14.

Further, in the embodiment, while the case in which the present invention is applied to the above-mentioned brake lamp has been exemplified, when the brake lamp is configured, in addition to the light source 2 or the first and second light guide lenses 3 and 4 serving as the inner lens, for example, the tail lamp can be combined with another member such as an outer lens, a reflector, an extension, or the like. In addition, shapes of the first and second light guide lenses 3 and 4, or numbers, dispositions, or the like, of the light emitting elements 5a, 5b and 5c can be appropriately changed according to a design or the like of an actual vehicle.

In addition, the lighting tool for a vehicle to which the present invention is applied is not limited to the above-mentioned brake lamp, and the present invention can be widely applied to a lighting tool for a vehicle including a light source and a light guide lens, for example, a headlight (headlamp) for a vehicle, a width indicator (position lamp), a subsidiary headlight (sub-headlamp), a front (rear) fog light (fog lamp), a daytime lighting (daytime running) lamp, a lid lamp, a tail light (tail lamp), a back lamp, a direction indicator (blinker lamp), or the like.

In addition, the light source may use a light emitting element such as a laser diode (LD) or the like, in addition to the above-mentioned LED. In addition, a color of the light emitted from the light emitting element is not limited to the above-mentioned red light and may also be appropriately changed to white light, orange light, or the like, according to a use of the light source.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:
1. A lighting tool for a vehicle comprising:
a light source;
a first light guide lens disposed in front of the light source; and
a light guide section,
wherein the light source includes a plurality of light emitting elements mounted on a same substrate,
the first light guide lens includes a first entering section located on a side facing the light source and a first emitting section located on an opposite side with respect to the first entering section,
the first emitting section has an inclined shape or a curved shaped so that at least an outer side in a vehicle width direction thereof retreats further than an inner side in the vehicle width direction thereof with respect to a vehicle forward and rearward direction,
the plurality of light emitting elements are disposed so as to be aligned from an inner side toward an outer side in the vehicle width direction, and include (i) a first light emitting element disposed at a position overlapping the first entering section at the inner side in the vehicle width direction when seen in a front view, and (ii) a second light emitting element disposed at a position that does not overlap the first entering section at the outer side in the vehicle width direction when seen in the front view,
the light guide section configured to guide at least a part of light emitted from the second light emitting element to a position corresponding to the outer side of the first entering section in the vehicle width direction is provided between the second light emitting element and the first entering section,
the second light emitting element is disposed around an outer end portion of the first light guide lens in the vehicle width direction, and the light guide section guides at least some of light emitted from the at least two second light emitting elements disposed around the outer end portion of the first light guide lens in the vehicle width direction to the same position corresponding to the outer side of the first entering section in the vehicle width direction.

2. The lighting tool for a vehicle according to claim 1, wherein the first entering section includes a first entering end portion configured to cause light emitted from the first light emitting element to enter the first light guide lens, and the light guide section includes a second entering end portion configured to cause at least some of light emitted from the second light emitting element to enter thereinto, and a light guide reflecting section configured to guide light entered from the second entering end portion to a position corresponding to the outer side of the first entering section in the vehicle width direction while reflecting the light therein.

3. The lighting tool for a vehicle according to claim 1, wherein the outer end portion of the first light guide lens in the vehicle width direction configures a curved section which is curved upward.

4. The lighting tool for a vehicle according to claim 3, wherein at least two second light emitting elements are disposed to be arranged along a shape of the curved section.

5. The lighting tool for a vehicle according to claim 1, wherein the light guide section is constituted by at least a part of the first light guide lens.

6. The lighting tool for a vehicle according to claim 1, wherein the light guide section is constituted by at least a part of the second light guide lens.

7. The lighting tool for a vehicle according to claim 1, wherein the first light guide lens is constituted by an acryl resin or a polycarbonate resin.

8. The lighting tool for a vehicle according to claim 1, wherein the lighting tool for a vehicle is a brake lamp of the vehicle.

9. A lighting tool for a vehicle comprising:
a light source;
a first light guide lens disposed in front of the light source; and
a light guide section,
wherein the light source includes a plurality of light emitting elements mounted on a same substrate,
the first light guide lens includes a first entering section located on a side facing the light source and a first emitting section located on an opposite side with respect to the first entering section,
the first emitting section has an inclined shape or a curved shaped so that at least an outer side in a vehicle width direction thereof retreats further than an inner side in the vehicle width direction thereof with respect to a vehicle forward and rearward direction,
the plurality of light emitting elements are disposed so as to be aligned from an inner side toward an outer side in the vehicle width direction, and include (i) a first light emitting element disposed at a position overlapping the first entering section at the inner side in the vehicle width direction when seen in a front view, and (ii) a second light emitting element disposed at a position that does not overlap the first entering section at the outer side in the vehicle width direction when seen in the front view,
the light guide section configured to guide at least a part of light emitted from the second light emitting element to a position corresponding to the outer side of the first entering section in the vehicle width direction is provided between the second light emitting element and the first entering section,
the lighting tool for a vehicle further comprising a second light guide lens that is disposed in front of the second light emitting element and that is adjacent to the first light guide lens,
wherein the second light guide lens includes a second entering section located on a side facing the second light emitting element and a second emitting section located on an opposite side with respect to the second entering section,
the second light emitting element is disposed at a position overlapping the second entering section outside in the vehicle width direction when seen in the front view, and
the second entering section includes a fourth entering end portion configured to cause at least some of light emitted from the second light emitting element to enter the second light guide lens.

10. The lighting tool for a vehicle according to claim 9, wherein the second emitting section has an inclined shape or a curved shape so that at least an outer side in the vehicle width direction thereof retreats further than an inner side in the vehicle width direction thereof with respect to the vehicle forward and rearward direction,
the plurality of light emitting elements further include a third light emitting element disposed at a position overlapping the second entering section at an inner side in the vehicle width direction when seen in the front view, and
the second entering section includes a third entering end portion, which is configured to cause light emitted from the third light emitting element to enter the second light guide lens, in addition to the fourth entering end portion.

11. The lighting tool for a vehicle according to claim 9, wherein the second light guide lens is disposed adjacent to at least an outer end portion of the first light guide lens in the vehicle width direction.

12. The lighting tool for a vehicle according to claim 9, wherein the first light guide lens is constituted by an acryl resin or a polycarbonate resin.

13. The lighting tool for a vehicle according to claim 9, wherein the lighting tool for a vehicle is a brake lamp of the vehicle.

14. The lighting tool for a vehicle according to claim 9, wherein the light guide section is constituted by at least a part of the second light guide lens.

* * * * *